United States Patent [19]

Fujii et al.

[11] Patent Number: 4,637,710

[45] Date of Patent: Jan. 20, 1987

[54] DRUM TYPE IMAGE SCANNING AND RECORDING APPARATUS

[75] Inventors: Teruo Fujii; Tomikazu Tsutsui, both of Kyoto, Japan

[73] Assignee: Dainippon Screen Mfg. Co., Ltd., Kyoto, Japan

[21] Appl. No.: 799,727

[22] Filed: Nov. 19, 1985

[30] Foreign Application Priority Data

Dec. 3, 1984 [JP] Japan ................. 59-256166

[51] Int. Cl.⁴ .............. G03B 27/58; H04N 1/08
[52] U.S. Cl. .................... 355/72; 346/138; 355/75; 355/104; 355/110; 358/291
[58] Field of Search ............ 355/110, 72, 75, 104; 358/285, 291, 292; 346/138; 226/11

[56] References Cited

U.S. PATENT DOCUMENTS

| | | | |
|---|---|---|---|
| 3,938,119 | 2/1976 | Schwartz | 226/11 X |
| 4,054,884 | 10/1977 | Nelson | 358/291 X |
| 4,111,565 | 9/1978 | Jagger | 226/11 X |
| 4,204,180 | 5/1980 | Usui et al. | 226/11 X |
| 4,330,798 | 5/1982 | Heyer et al. | 358/291 |
| 4,440,491 | 4/1984 | Takahama | 358/291 X |

FOREIGN PATENT DOCUMENTS 60-46658  3/1985  Japan .

Primary Examiner—Richard A. Wintercorn
Attorney, Agent, or Firm—Lowe Price LeBlanc Becker & Shur

[57] ABSTRACT

A drum type image scanning and recording apparatus, with a drum around whose cylindrical external surface a film is fixedly wrapped and a drum-driving apparatus mechanically coupled to the drum for rotating the drum, has a string tensionally stretched nearby and along the external surface of the drum in parallel with the drum axis by a string stretching device. A swing detecting device detects the swing of the string produced when part of the film and the string are in contact with each other, as when the drum is rotating and the film separates away from the drum external surface. The rotation of the drum is stopped in response to an abnormality detection signal from the swing detecting device, thus precluding significant physical separation of the film from the drum.

6 Claims, 3 Drawing Figures

DRUM TYPE IMAGE SCANNING AND RECORDING APPARATUS

BACKGROUND OF THE INVENTION

1. Field of the Invention

This invention relates to a drum type image scanning and recording apparatus and, more particularly, to an apparatus for protecting a photosensitive material such as a photosensitive film (or an original picture) wrapped on a recording drum (or a scanning drum) and attached to the drum by vacuum to prevent separation of the material from the surface of the drum as the drum rotates.

2. Description of the Prior Art

In an image scanning and recording apparatus of a cylindrically scanning type, particularly in such apparatus used for graphic arts or the like, the following steps are taken for attaching a photosensitive material such as a film, a photographic paper or the like (referred to as "film" hereinafter) to a drum in a recording unit, or for attaching an original picture to a drum in a scanning unit: perforating several holes in a line near the leading edge of the film; fitting said holes to pins (preferably the same number as the holes) aligned on the external surface of the drum and in parallel with the drum axis; tensionally wrapping the film on the drum by pulling a free or unpinned edge of the film; attaching securely the ending edge of the film to the drum using an adhesive tape or a press bar; and, at the same time, vacuum suctioning the film by way of small holes penetrating from the surface to the interior of the drum, thus positively attaching the film to the external surface of the drum.

However, in such a method perforating of the film is necessary, and so is the process of securely attaching the ending edge of film to the drum by means of an adhesive tape or a press bar if the process of tensionally attaching the film to the recording drum is to be automated. These processes pose serious technical obstacles in automatization. In addition, the perforated part and the taped part of the film cause a reduction in the effective area of the film; when the pins are fitted to the holes, the film becomes deformed; and, when the film is taped, the adhesive tends to stick to the surface of the recording drum, thereby contaminating film used later on the same drum. To eliminate such inconveniences, and to make the process of tensionally attaching the film to the recording drum amenable to automatization, it is desirable that the pins on the external surface of the recording drum and the method for attaching the film by taping or the like both be omitted.

Instead, the film can be tensionally attached securely to the recording drum solely by vacuum suctioning through small holes perforated on the external surface of the recording drum.

However, when the film is tensionally attached to the drum solely by vacuum suction force and this force is reduced or lost suddenly while the drum is rotating the film will immediately separate away from the external surface of the drum by centrifugal force because there are no other retaining means e.g., pins or tape. After such an event, even if the film is rewrapped on the drum, it is difficult to return the film to its original wrapped position and may become useless. Moreover, such an event can lead to damage to expensive components, e.g., the drum surface or a focussing lens of a recording head.

In view of the above problem, the applicant has proposed a drum-type image scanning and recording apparatus, as disclosed in Japanese Patent Application No. SHO 58-155664, in which: a film is kept from separating away from a rotating recording drum even in an emergency such as a power failure, vacuum apparatus failure, or the like by providing that in such an emergency, the film is kept suctioned (by vacuum) to the drum external surface for a long time.

Even without an emergency or vacuum failure, separation of the film from the drum may occur because a rolled film itself has a propensity to curl; and complete or partial clogging of the holes perforated in the recording drum external surface may cause the film to float away from the drum surface, thus producing gaps therebetween, even during the initial stage of mounting the film on the recording drum. Among such causes that may make the film float, the propensity in the film itself to curl up is significant in rolled film that has been cut off at the part immediately adjacent the reel. This propensity of the rolled film is due to a stepwise part of the film which appears at the beginning part of the film when it is rolled on the reel. It is also due to the unevenness of the surface of the reel itself, or due to the smaller inside diameter of the reel. Such problems cannot be entirely avoided when a rolled film is used. Also, even when taping is used for attaching the film to the drum, the tape may come off the drum while it is rotating.

Accordingly, in order to prevent the film from separating away from the drum the latter has to stop rotating immediately when the film begins to lift away from the drum surface. The applicant has investigated this problem to detect the floating or lifting of the film, using several microswitches placed in the vicinity of the recording drum surface. However, floating could not thus be securely detected because the floating part of the film was easily flattened when pressed by the switches. Even when floating could be detected, the film got hooked by the detecting levers of the microswitches, thereby promoting the film separation. Subsequently, the applicant investigated an optical detecting means for detecting floating of the film in a noncontacting way in which a light beam is projected nearby and along the recording drum external surface, in parallel with the axis of the drum, said light beam being interrupted when the floating of the film occurs. However, in order to attain adequate detection accuracy such optical detection means requires complex and expensive apparatus, including the use of a laser oscillator as a light source. A need, therefore, exists for a simple and inexpensive solution that will hold film securely to a rotating drum.

SUMMARY OF THE INVENTION

It is an object of this invention to provide a drum type image scanning and recording apparatus of a simple structure, capable of accurately detecting floating of a film away from the drum, and able to prevent problems that arise when the film separates from a rotating drum and causes damage to other elements.

Therefore, to accomplish this object according to this invention, a string is tensionally stretched at a slight distance from the external surface of the drum, in parallel with its axis of rotation, so that when a part of the film floats away from the surface of the drum and the drum is rotating, such a floating part of the film and the string come into contact with each other and the string swings. The swing is then detected by a swing detecting means and an abnormality detection signal sent out of said detecting means is inputted to the drum driving apparatus, thereby making a brake mechanism stop the rotation of the recording drum immediately. At that instant, the centrifugal force impressed to the film goes down suddenly, so that the film remains attached to the drum external surface.

When the floating part of the film comes in contact with the string, the string being light and mobile only swings as if it is flipped and never hooks or scatters the film. Also, the string swings in response to just modest contact with the separated film.

As described above, if the film floats away from the drum which is rotating (or if the film has already floated at the time it was first attached to the drum), the apparatus of this invention can securely detect it so as to stop the rotation of the drum, and prevent the film from scattering and injuring the surface of the drum, recording head, or scanning head and thus leading to its own loss.

BRIEF DESCRIPTION OF THE DRAWINGS

Other objects, features, and advantages of the present invention will be seen in connection with the accompanying drawings, in which.

DESCRIPTION OF THE PREFERRED EMBODIMENTS

Several embodiments of this invention are described hereunder with reference to the accompanying drawings.

Figure 1:
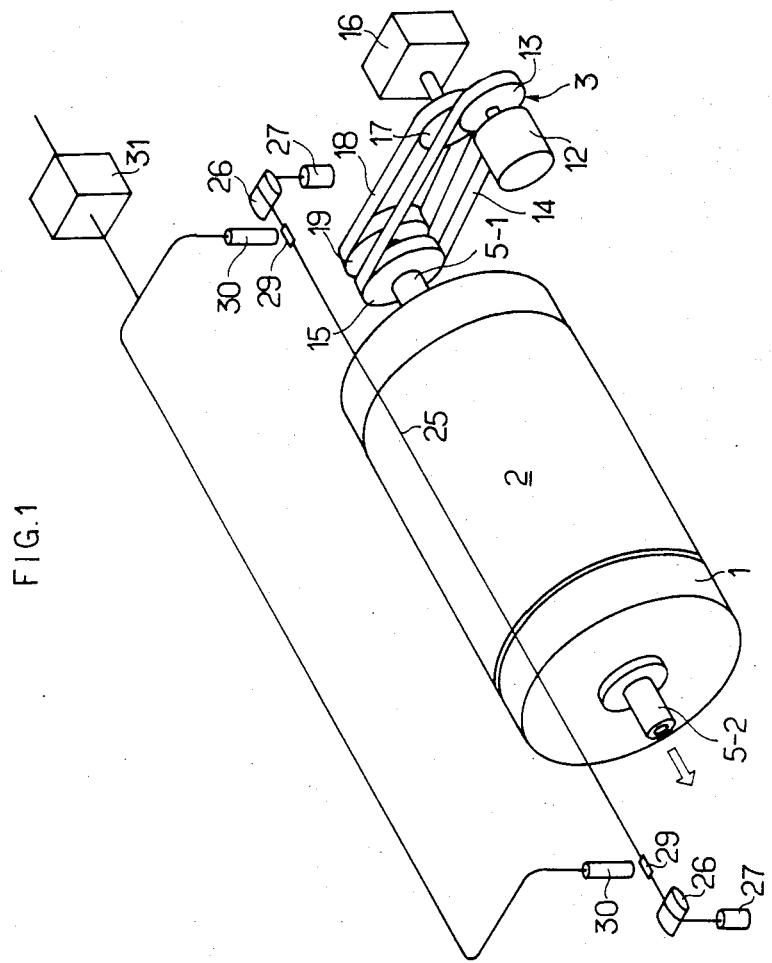
FIG. 1 is a perspective view showing the fundamental construction of a typical recording unit of a drum type image scanning and recording apparatus illustrating an embodiment of this invention.
Figure 2:
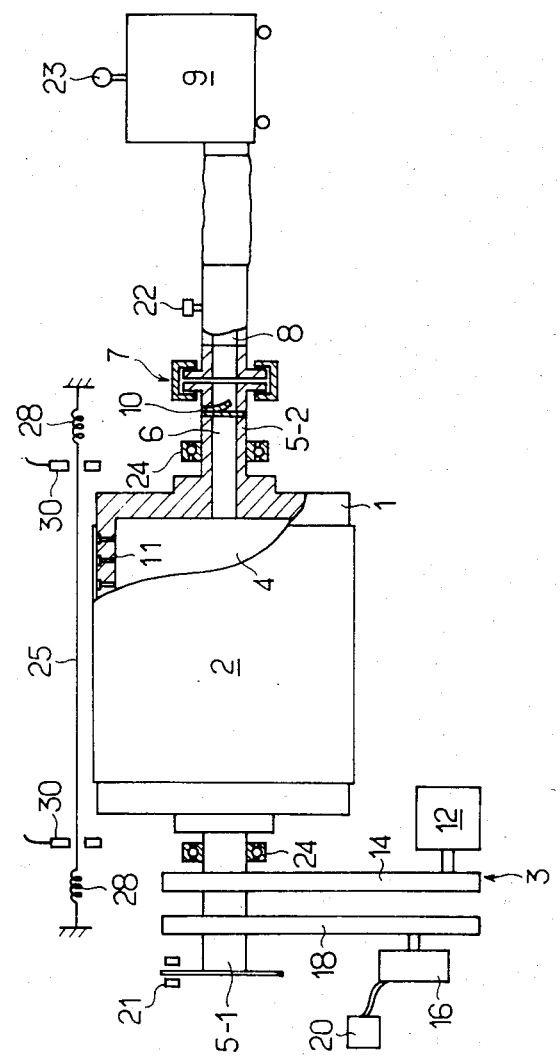
FIG. 2 is a side elevation view, partly in cross section, showing the fundamental construction of a typical recording unit of a drum type image scanning and recording apparatus illustrating another embodiment of this invention.

FIG. 1 is a perspective view showing the fundamental construction of a typical recording unit of a drum type image scanning and recording apparatus illustrating an embodiment of this invention, and FIG. 2 is a side elevational view, partly in cross section, showing typical fundamental construction of apparatus illustrating another embodiment of this invention. However, for simplicity of illustration, a typical recording head which projects a light flux on a film for exposing it while traveling reciprocatively along the film surface and in parallel with the recording drum axis direction is omitted in these drawings. Also, in FIG. 1, illustration of a vacuum suctioning means is omitted.

In these drawings, a film 2 is tensionally attached to the external surface of a recording drum 1. The drum 1 is driven at a high rotational speed by a drum-driving apparatus 3 which is coupled with it via hollow main shaft 5. Inside main shaft 5, there is provided a connecting channel 6 leading to a cavity 4 of the recording drum 1 along the axis. Connecting channel 6 is fluidly connected to one end of a vacuum suction channel 8 by way of a seal, e.g., a labyrinth seal 7. To the other end of the vacuum suction channel 8, there is connected a vacuum apparatus 9. This vacuum apparatus, e.g., an exhasting blower, keeps the cavity 4 of drum 1 depressurized by way of the vacuum suction channel 8 and the connecting channel 6. Thus suctioning (by vacuum) causes attachment of film 2 to the external surface of the drum 1 through small holes 11 which penetrate fom the drum external surface to the interior cavity.

There is also provided a check valve 10 at an appropriate position in the connecting channel 6. When the capability of the vacuum apparatus 9 goes down on account of power failure, blower failure or the like, the check valve 10 blocks off the connection between the cavity 4 of the recording drum 1 and the atmosphere by closing up. This enables the cavity 4 to maintain its already established depressurized state and separation of the film 2 from the recording drum 1 is prevented. Further, it is necessary to place the check valve 10 adjacent the recording drum 1 as seen from the labyrinth 7 so as to prevent vacuum breakage through the labyrinth 7.

As shown in FIG. 1, an electric motor 12 is coupled to the main shaft 5 by way of a motor shaft pulley 13, a timing belt 14 and a main shaft pulley 15, and rotates the recording drum 1. A power brake 16 is also coupled to the main shaft 5 by way of a brake shaft pulley 17, a timing belt 18 and a main shaft pulley 19. Also, as shown in FIG. 2, a battery 20 is provided to power the apparatus in the event of a power failure. Further, a disk brake 21 is provided as an additional brake mechanism. The reason for providing two brake systems is to perform the braking securely and quickly. However, either brake should suffice.

When the capability of the vacuum apparatus 9 goes down on account of power failure, blower failure or the like, a pressure sensor 22 detects the abnormality of the pneumatic pressure inside the vacuum suction channel 8 and provides an abnormality detection signal to the brake mechanisms 16 and 17 to effect braking, thereby quickly stopping the rotation of the recording drum 1. A temperature sensor 23 is also provided, to prevent overheating problems in the event that the fuse for the blower does not function normally. Bearings 24 are provided as shown in FIG. 2.

The foregoing describes a structure generally typical of conventional rotating drum type apparatus. However, in the apparatus of FIG. 1, bases on this invention, there is additionally provided a string 25 which is tensionally stretched at a slight distance from the external surface of the recording drum 1 and in parallel with the direction of the axis of the drum. In the embodiment shown in FIG. 1, the parts near the ends of the string 25 are tensionally supported by guides 26, with the ends of the string connected by hanging weights 27 so that the string 25 is always supported with an approximately constant tension.

For the string stretching means, as shown in FIG. 2, it is also suitable to connect both ends of the string 25 to tension springs 28 for subjecting the string 25 to an approximately constant tension. Other methods can also be considered. In any case, it is necessary for the string 25 to be able to experience a detectable displacement while receiving quite a light force when part of the film 2 comes in contact with it.

There are provided strongly magnetic substances 29 adjacent both ends of string 25. Opposite to the magnetic substances 29 there are provided magnetic sensors 30 which are out of contact with the magnetic substances 29. These magnetic sensors 30 give abnormality detection signals in case the film 2 wrapped on the external surface of the recording drum 1 separates away from the drum surface. When the film 2 comes in contact with string 25 it will make string 25 swing and an abnormality signal is generated by sensors 30 when the amplitude of the swing exceeds a predetermined set value. The abnormality detection signals are amplified by an amplifier 31 and then inputted to the drum driving apparatus 3 and the brake mechanisms 16, 21 thereby operating the brake mechanisms 16 and 21 and instantly stopping the motor 12 and the rotation of the recording drum 1. At that instant, film 2 suddenly becomes subjected to less centrifugal force and is enabled to remain attached to the external surface of the recording drum 1. Further, if the above abnormality detection signal is used for generating an error indication, e.g., a sound or flashing light, it is helpful to the operator.

Figure 3:
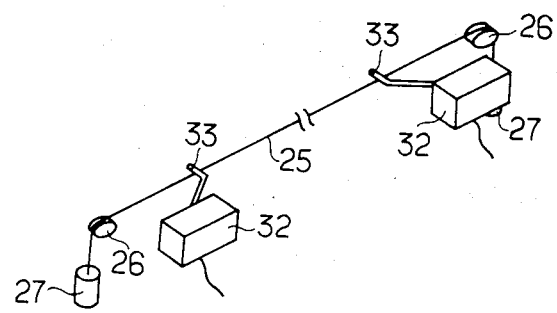
FIG. 3 is a perspective view illustrating another embodiment of a swing detecting means of this invention.

In another embodiment, for the swing detecting means to detect the swing of the string 25, actuators 32 whose operation levers 33 are made to contact with part of the string 25 can also be utilized as shown in FIG. 3. Either of such a contacting type and a noncontacting type of the swing detecting means will do but the swing detecting means must be so constructed that the swing of the string 25 may not be hindered thereby.

Further, the swing detecting means can comprise a mechanism in which a light shielding piece attached to the string may interrupt a path of a light (when the string makes a swing) and thus detect the swing of the string. However, it would be necessary to design this swing detecting means so that the light may not expose the film, e.g., by using an infrared ray as the light.

In said swing detecting means, the distance between the string 25 and the external surface of the recording drum 1 conveniently should be about 1-2 mm, e.g., in case of the recording drum of an electronic color separator for photocopying process in which a silver salt film is subjected to scanning and exposing. However, this distance should be determined in accordance with the vacuum suction force and the centrifugal force to be exerted on the film, namely, in accordance with factors such as the speed of revolution and diameter of the recording drum and the weight of the film. Accordingly, said distance is not limited to the above-mentioned values. However, in case a film positioning means using pins aligned on the external surface of the recording drum 1 is used at the same time, the pin projection length should be appropriately shortened in order that the pins may not make contact with the string. The disk brake mechanism 21 is advantageous but where the speed of rotation of the drum is low it is not necessary.

The foregoing embodiments of this invention are described with regard to a recording apparatus. However, this invention can also be applicable to a scanning unit of said apparatus to which original picures are attached to be scanned optically.

While the invention has been particularly shown and described with reference to preferred embodiments thereof, it will be understood by those skilled in the art that changes in form and details can be made therein without departing from the spirit and scope of the invention.

What is claimed is:

1. A drum type image scanning and recording apparatus having a drum, around whose cylindrical external surface a film is fixedly wrapped, and a drum driving apparatus mechanically coupled to said drum for rotating the drum, the apparatus comprising:
   a string tensionally stretched close to and along the external surface of said drum in parallel with the drum axis;
   string stretching means for supporting said string tensionally;
   swing detecting means for detecting the swing of said string produced when part of the film and said string are in contact with each other when said drum is rotating and the film separates away from the drum external surface; and
   drum braking means for stopping rotation of the drum in accordance with said detection signal from said swing detecting means.

2. A drum type image scanning and recording apparatus as set forth in claim 1, wherein:
   the rotation of the drum is stopped by a brake mechanism coupled directly to the drum and which operates in response to said detection signal from said swing detecting means.

3. A drum type image scanning and recording apparatus as set forth in claim 1, wherein:
   said swing detecting means comprises actuators with operation levers which contact a part of said string when said string is itself contacted by separation of said film from said drum.

4. A drum type image scanning and recording apparatus as set forth in claim 1, wherein:
   said swing detecting means comprises a magnetic substance attached to a part of said string; and
   a magnetic sensor provided adjacent to and out of contact with said magnetic substance but responsive thereto.

5. A drum type image scanning and recording apparatus as set forth in claim 1, wherein the string stretching means comprises:
   a guide for tensionally supporting said string near its ends; and
   a weight connected to at least one end of said string.

6. A drum type image scanning and recording apparatus as set forth in claim 1, wherein:
   said string stretching means comprises tension springs connected to at least one end of said string.

* * * * *